US006153287A

United States Patent [19]
Gasnier

[11] Patent Number: 6,153,287
[45] Date of Patent: Nov. 28, 2000

[54] FOOD PRODUCT PACKAGING WITH A HIDDEN BUILT-IN ANTI-THEFT DEVICE AND A METHOD FOR PREPARING SUCH PACKAGING

[75] Inventor: Yves M. Gasnier, Boucau, France

[73] Assignee: Labeyrie S.A., St. Vincent de Tyrosse, Cedex, France

[21] Appl. No.: 08/693,785

[22] Filed: Aug. 9, 1996

[30] Foreign Application Priority Data

Aug. 11, 1995 [FR] France .................................. 95 09962

[51] Int. Cl.[7] .................................................. B32B 23/02

[52] U.S. Cl. ........................ 428/192; 428/35.7; 428/40.4; 428/75; 428/76; 428/195; 428/209; 428/354; 428/913; 428/916; 264/167; 264/272.17; 283/72; 283/91; 206/308.2

[58] Field of Search .................................... 156/295, 324; 428/195, 913, 209, 916, 354, 40.4, 77, 75, 76, 35.7, 339, 210, 192; 430/10; 264/167, 272.17; 283/72, 91; 340/572, 551, 552; 206/807, 308.2

[56] References Cited

U.S. PATENT DOCUMENTS

| | | | |
|---|---|---|---|
| 4,024,976 | 5/1977 | Acton | 215/32 |
| 5,081,446 | 1/1992 | Gill et al. . | |

FOREIGN PATENT DOCUMENTS

| | | |
|---|---|---|
| 2 621 156 | 3/1989 | France . |
| 2 668 483 | 9/1993 | France . |
| 2 688 483 | 9/1993 | France . |
| 42 42 992 | 6/1994 | Germany . |
| 2210235 | 6/1989 | United Kingdom . |

OTHER PUBLICATIONS

French Search Report dated May 12, 1996.

*Primary Examiner*—Deborah Jones
*Assistant Examiner*—Abraham Bahta
*Attorney, Agent, or Firm*—Millen, White, Zelano & Branigan, P.C.

[57] ABSTRACT

The invention concerns a conditioning arrangement for a product such as a food product equipped with a theft-proof marking device characterized by the fact that the theft-proof marking device is incorporated into the structure of the conditioning material during the manufacturing of said material. The invention also concerns a product contained in such conditioning as well as a process for theft-proof marking of a product in which a theft-proof marking device is incorporated into the product conditioning material during the manufacturing of that material. This applies more particularly to the theft-proof marking of products intended for distribution trade and for the manufacturing of conditioning materials.

14 Claims, 1 Drawing Sheet

FOOD PRODUCT PACKAGING WITH A HIDDEN BUILT-IN ANTI-THEFT DEVICE AND A METHOD FOR PREPARING SUCH PACKAGING

BACKGROUND

The present invention concerns a packaging for a product such as a food product, provided with a theft-proof marking device, a product contained in such packaging and a process for theft-proof marking of a product.

In order to combat against the theft of articles, in particular small articles of high value, shops have established detection systems at the shop entrance and exit points. Such detection installations generally include a radio-electric signal control transmitter and a receiver. The articles liable to be stolen, prior to being put on sale, are equipped with a transmitter/receiver element, generally in the form of a linear or loop wire element. When an article passes near the detection installation, the control signal is received by the transmitter/receiver element. This element then transmits in return a detection signal, perceived by the detection installation receiver. The detection of the passage of a marked article habitually generates an audible signal designed to draw the attention of the shop supervisory personnel.

Until now, attempts have been made to equip marketed items with theft-proof devices related to the transmitter/receiver element on packaging of the product i.e. either on the package or on the container of the product.

Accordingly, the transmitter/receiver element may be in the form of a small box attached to the product by a clip or by any other means.

The theft-proof device is then clearly visible to a possible thief who may pull it off, if necessary while deteriorating the product. In addition, the box is often detrimental to the appearance of the article presented for sale.

As an alternative, the transmitter/receiver element may be placed on the underside of a self-adhesive sticker affixed to the product. The sticker may include, for instance, a bar code or another indication. The theft-proof device is thus concealed beneath the label. But once its true function is known, it is easy to remove the label by tearing it away or detaching it. An example of an embodiment such as this is described in document EP-A-0 635 811.

Attempts have also been made to conceal the theft-proof device for instance, in a fold of the container or within the package. The wire element forming the theft-proof device is then generally surrounded by an envelope or a plastic sheath, possibly self-adhesive, protecting it and facilitating manipulation in particular by cutting and positioning. However, once the location of the theft-proof device is known, the latter may easily be pulled away or lifted away once the package has been opened.

An example of an embodiment such as this is described in document FR-A-2 688 483.

Further, in other realizations, attempts have been made to attach the detection element to the product by concealing it in the package during its assembly, for instance beneath the attaching tabs of a cardboard package.

In another alternative, the detection element is attached to the packaging of the product before or during packaging and therefore at this stage of product production and upstream of marketing. The theft-proof device is not visible from the outside.

However, by removing the package, it is possible to discover the location of the detection element. By pulling away or destroying the package, the thief can still eliminate the detection element.

SUMMARY

The purpose of the invention is to remedy the drawbacks of the prior state-of-the-art by proposing a package for a product, in particular a package or container equipped with a theft-proof marking device in which said theft-proof marking device cannot be removed, pulled away or eradicated, even if the thief has located its probable or definite position.

Another purpose of the invention is to propose a process for marking a package whereby this result may be obtained. An additional purpose of the invention is to supply packages equipped with a theft-proof marking device which are simple and cheap to manufacturer.

Accordingly, the packaging for a product such as a food product, equipped with a theft-proof marking device is characterized in accordance with the invention by the fact that the theft-proof marking device is incorporated into the structure of the material of packaging during the manufacture of said material.

The theft-proof device may, for instance, be in the form of a wire element.

Preferably, it is incorporated into the primary packaging of the product i.e. the packaging that is directly in contact with the product or that is made integral with it.

The packaging material in which the theft-proof marking device is incorporated may be, for instance, a molded mass or a multi-layer film, etc.

The invention also concerns a product contained in a packaging equipped with a theft-proof marking device according to the invention as well as a theft-proof marking process for a product contained in packaging in which a theft-proof marking device is integrated into the structure of the material for packaging the product, during the production of said material.

This invention is applicable to the preservation and marketing of all types of products, in particular those put on sale in self-service stores. Obviously, the invention applies more particularly to products of high value, currently already provided with theft-proof marking. However, the simplicity and low cost of the invention means that the application can be extended to other products and/or other situations.

Naturally enough, the invention applies also to the manufacturing of product packaging materials.

The invention provides the means of obtaining products equipped with a totally hidden theft-proof arrangement.

The theft-proof arrangement can therefore be larger, better located and be more efficient for transmission/reception with respect to the existing detection installations.

The appearance of the products is not deteriorated because the integrated theft-proof device is totally concealed without the use of covers, labels, protections of any types.

Even when its location is known, the theft-proof device cannot be removed without destroying the primary packaging of the product in its entirety, thus making it untransportable or of no interest.

The incorporation of the theft-proof device into the packaging at the manufacturing stage is a way of relieving the sales network of the task of marking articles put on sale, and likewise the manufacturers who package their products using containers or packagings that are already equipped.

The theft-proof marking operation is thus considerably simplified because the theft-proof device can be, for instance, a wire element alone, in a line or in a loop, but without an envelope supporting neither a protection box or any means of concealment. Operations of cutting and placing the wire element by integration into the packaging material during manufacturing of the material can therefore become totally automated and systematic.

The invention also offers the advantage of cutting on costs connected to the organization of the steps against product theft both at manufacturing and distribution levels as concerns anti-theft marking operations.

Other aspects and advantages of the invention will become apparent from the following more detailed description, taken in conjunction with the accompanying drawings.

DESCRIPTION OF EMBODIMENTS

Figure 1:
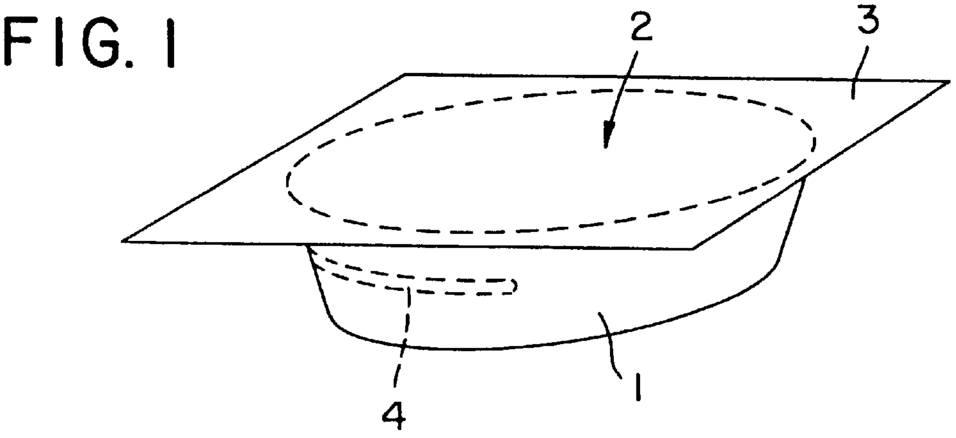
FIG. 1 is a perspective view of an open recipient with a cap, equipped with an anti-theft marking device according to the invention.

FIG. 1 represents a recipient of plastic equipped with an anti-theft marking device according to the invention. In this case, it is a tray 1, for instance for a food product, having an upper opening 2 covered by cap 3 in the form of a metal or plastic flexible or semi-rigid multi-layer film, made integral with the peripheral edge of opening 2 so as to hermetically seal recipient 1.

This recipient is designed to contain directly a food product i.e. tray 1 and cap 3 are liable to be directly in contact with the food.

Figure 2:
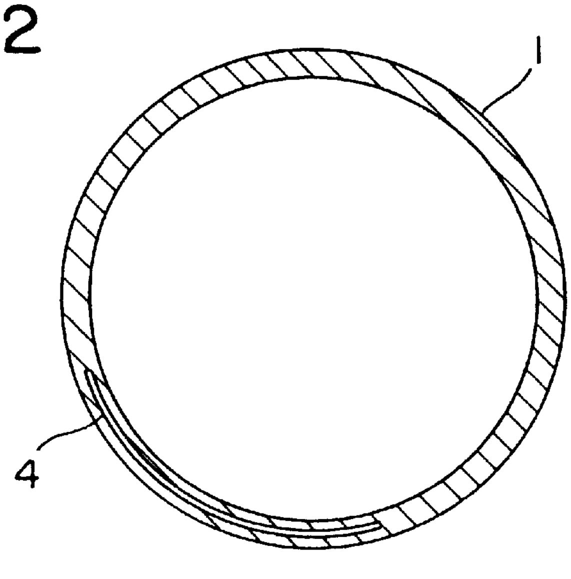
FIG. 2 is a plan and a sectional view of the recipient in FIG. 1.

As can be seen more particularly in FIG. 2, the theft-proof marking device is in the form of a wire element 4 integrated into the mass of the material forming tray 1.

To this purpose, wire element 4, during the manufacturing of tray 1, has been incorporated into the mass to be molded before passage into the mold, or has been applied before molding to the wall of the mold at the location where the tray is to be integrated.

Figure 3:
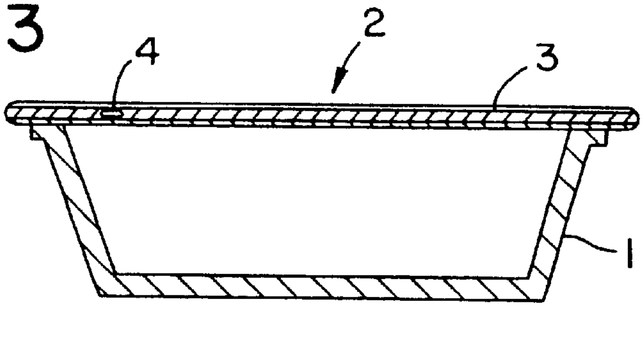
FIG. 3 is a transversal sectional view of the recipient with a cap, in an alternative arrangement of the invention.

In an alternative realization shown in FIG. 3, wire element 4 forms the theft-proof marking device and is placed between the layers of the film of cap 3.

To this purpose, it has been incorporated in the multilayer film during the manufacturing of this material.

This alternative is a way of obtaining theft-proof marking according to the invention at low cost.

Naturally, instead of a tray, the recipient could be a jar or any other form adapted to the product to be contained.

Similarly, the package could be a package consisting of a paper wrapper or a cardboard box. In this case, the wire element can be embedded in the sheet of paper or cardboard during manufacturing. In the case of multilayer paper or cardboard, the wire element can be place on the inside, between layers, before they are joined.

I claim:

1. A package for a food product, said package comprising:

a container, which is in direct contact with said food product inside said container; and an anti-theft marking device, which is invisibly embedded within said container so as not to be in direct contact with said food product.

2. A package for a food product according to claim 1, wherein said container is made of moldable plastic material.

3. A package for a food product according to claim 1, wherein said container is made of moldable metal material.

4. A package for a food product according to claim 1, wherein said container is made of multi-layer plastic material.

5. A package for a food product according to claim 1, wherein said container is made of multi-layer metal material.

6. A method for making a package for a food product, said method comprising the steps of:

heating a moldable material, said moldable material capable of achieving a pliable state of matter and of conforming to a mold;

inserting an anti-theft marking device into said mold, said mold configured to produce a container;

inserting said heated, moldable material into said mold so as to embed the anti-theft marking device within the moldable material; and removing said container from said mold, said anti-theft marking device being invisibly embedded in said container such that said anti-theft marking device cannot come into direct contact with said food product.

7. A method for making a package for a food product according to claim 6, wherein said moldable material is plastic.

8. A method for making a package for a food product according to claim 6, wherein said moldable material is metal.

9. A method for making a package for a food product, said method comprising the steps of:

heating a moldable material, said moldable material capable of achieving a pliable state of matter and of conforming to a mold;

inserting said heated, moldable material and said anti-theft marking device into said mold so as to embed the anti-theft marking device within the moldable material, said mold configured to produce a container; and removing said container from said mold, said anti-theft marking device being invisibly embedded in said container such that said anti-theft marking device cannot come into direct contact with said food product.

10. A method for making a package for a food product according to claim 9, wherein said moldable material is plastic.

11. A method for making a package for a food product according to claim 9, wherein said moldable material is metal.

12. A method for making a package for a food product, said method comprising the steps of:

heating a first layer and at least a second layer, said first layer and said second layer made of moldable material;

inserting an anti-theft marking device between said first layer and said second layer;

laminating said first layer and said second layer to create a multi-layer film so as to embed the anti-theft marking device within the multi-layer film; and shaping said multi-layer film to create said package, said anti-theft marking device being invisibly embedded in said container such that said anti-theft marking device cannot come into direct contact with said food product.

13. A method or making a package for a food product according to claim 12, wherein said first layer or said second layer is made of plastic.

14. A method for making a package for a food product according to claim 12, wherein said first layer or said second layer is made of metal.

* * * * *